US010928206B2

(12) United States Patent
Shikimachi et al.

(10) Patent No.: US 10,928,206 B2
(45) Date of Patent: Feb. 23, 2021

(54) VEHICLE CONTROL SYSTEM, OWN VEHICLE POSITION CALCULATION APPARATUS, VEHICLE CONTROL APPARATUS, OWN VEHICLE POSITION CALCULATION PROGRAM, AND NON-TRANSITORY COMPUTER READABLE STORAGE MEDIUM

(71) Applicant: DENSO CORPORATION, Kariya (JP)

(72) Inventors: Takeshi Shikimachi, Kariya (JP); Kiyoshi Tsurumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 41 days.

(21) Appl. No.: 16/276,668

(22) Filed: Feb. 15, 2019

(65) Prior Publication Data

US 2019/0178655 A1 Jun. 13, 2019

Related U.S. Application Data

(63) Continuation of application No. PCT/JP2017/020078, filed on May 30, 2017.

(30) Foreign Application Priority Data

Aug. 23, 2016 (JP) .............................. JP2016-162793

(51) Int. Cl.
*G01C 21/32* (2006.01)
*G08G 1/09* (2006.01)
(Continued)

(52) U.S. Cl.
CPC .............. *G01C 21/32* (2013.01); *B60W 30/00* (2013.01); *G05D 1/0274* (2013.01); *G06F 16/29* (2019.01);
(Continued)

(58) Field of Classification Search
CPC ......... G01C 21/32; G08G 1/09; B60W 30/00; G06T 7/75; G06T 2207/30244;
(Continued)

(56) References Cited

U.S. PATENT DOCUMENTS 6,415,227 B1 * 7/2002 Lin ........................ G01C 21/20
340/988
7,839,282 B1 * 11/2010 Mathur ................ G01D 5/2405
340/562
(Continued)

FOREIGN PATENT DOCUMENTS

JP H01308916 A 12/1989
JP 2009250713 A 10/2009
(Continued)

*Primary Examiner* — Frederick M Brushaber
(74) *Attorney, Agent, or Firm* — Harness, Dickey & Pierce, P.L.C.

(57) ABSTRACT

A vehicle control system includes an own vehicle position calculation section that calculates an own vehicle position on a map by using a coordinate system projected by a map projection method based on conformal map projection, which has conformality and represents most regions in the world with a single system, and a vehicle control section that controls a vehicle by using the own vehicle position calculated by the own vehicle position calculation section by using the coordinate system projected by the map projection method based on conformal map projection, which has conformality and represents most regions in the world with a single system.

10 Claims, 7 Drawing Sheets

(51) Int. Cl.
  *B60W 30/00*  (2006.01)
  *G06T 7/73*  (2017.01)
  *G06F 16/29*  (2019.01)
  *G05D 1/02*  (2020.01)
  *G09B 29/10*  (2006.01)
(52) U.S. Cl.
  CPC ............... *G06T 7/75* (2017.01); *G08G 1/09* (2013.01); *G05D 2201/0213* (2013.01); *G06T 2207/30244* (2013.01); *G06T 2207/30252* (2013.01); *G09B 29/10* (2013.01)
(58) Field of Classification Search
  CPC .......... G06T 2207/30252; G06F 16/29; G05D 1/0274; G05D 2201/0213; G09B 29/10
  See application file for complete search history.

(56) References Cited

U.S. PATENT DOCUMENTS

| | | | |
|---|---|---|---|
| 7,868,785 B1* | 1/2011 | Wang | G01C 23/00 340/972 |
| 8,897,917 B2 | 11/2014 | Tanaka et al. | |
| 9,244,461 B2 | 1/2016 | Tanaka et al. | |
| 10,304,244 B2* | 5/2019 | Chuang | G06T 15/04 |
| 2002/0062193 A1* | 5/2002 | Lin | G01S 19/49 701/472 |
| 2008/0059015 A1* | 3/2008 | Whittaker | G08G 1/161 701/23 |
| 2010/0100359 A1* | 4/2010 | Podoloff | G06F 3/038 702/191 |
| 2010/0225562 A1* | 9/2010 | Smith | G02B 1/007 343/909 |
| 2012/0113239 A1* | 5/2012 | Krupnik | A61B 1/0005 348/65 |
| 2012/0143488 A1* | 6/2012 | Othmezouri | G06K 9/00798 701/301 |
| 2013/0138338 A1* | 5/2013 | Behara | G01S 19/20 701/458 |
| 2018/0158345 A1* | 6/2018 | Hiddai | G01C 21/005 |
| 2018/0225835 A1* | 8/2018 | Harada | G01C 21/32 |
| 2019/0051051 A1* | 2/2019 | Kaufman | G06F 3/01 |
| 2019/0346678 A1* | 11/2019 | Nocham | H04W 4/029 |

FOREIGN PATENT DOCUMENTS

| | | |
|---|---|---|
| JP | 2010092147 A | 4/2010 |
| JP | 5157803 B2 | 3/2013 |
| JP | 2014228941 A | 12/2014 |

* cited by examiner

VEHICLE CONTROL SYSTEM, OWN VEHICLE POSITION CALCULATION APPARATUS, VEHICLE CONTROL APPARATUS, OWN VEHICLE POSITION CALCULATION PROGRAM, AND NON-TRANSITORY COMPUTER READABLE STORAGE MEDIUM

CROSS REFERENCE TO RELATED APPLICATIONS

The present application is a continuation application of International Patent Application No. PCT/JP2017/020078 filed on May 30, 2017, which designated the United States and claims the benefit of priority from Japanese Patent Application No. 2016-162793 filed on Aug. 23, 2016. The entire disclosures of all of the above applications are incorporated herein by reference.

TECHNICAL FIELD

The present disclosure relates to a vehicle control system, an own vehicle position calculation apparatus, a vehicle control apparatus, an own vehicle position calculation program, and a vehicle control program.

BACKGROUND

In systems that perform vehicle control using an own vehicle position such as an automatic driving system and an advanced driver assistance system (ADAS), the positions of features on a digital map is associated with the positions of features around the own vehicle measured by, for example, a camera, a millimeter wave, or a light detection and ranging (LIDAR) from an own vehicle position on the digital map. A digital map that represents the world is represented in a geographic coordinate system (that is, latitude and longitude), and an actual distance or an actual direction measured by, for example, a camera, a millimeter wave, or a LIDAR is represented in a plane rectangular coordinate system which is compatible with a vehicle-centered coordinate system.

SUMMARY

The present disclosure according to one aspect provides an own vehicle position calculation section calculates an own vehicle position on a map by using a coordinate system projected by a conformal map projection that has conformality and represents most regions in the world in a single system. A vehicle control section performs vehicle control using the own vehicle position calculated by the own vehicle position calculation section by using the coordinate system projected by the conformal map projection that has conformality and represents most regions in the world in a single system.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

Figure 1:
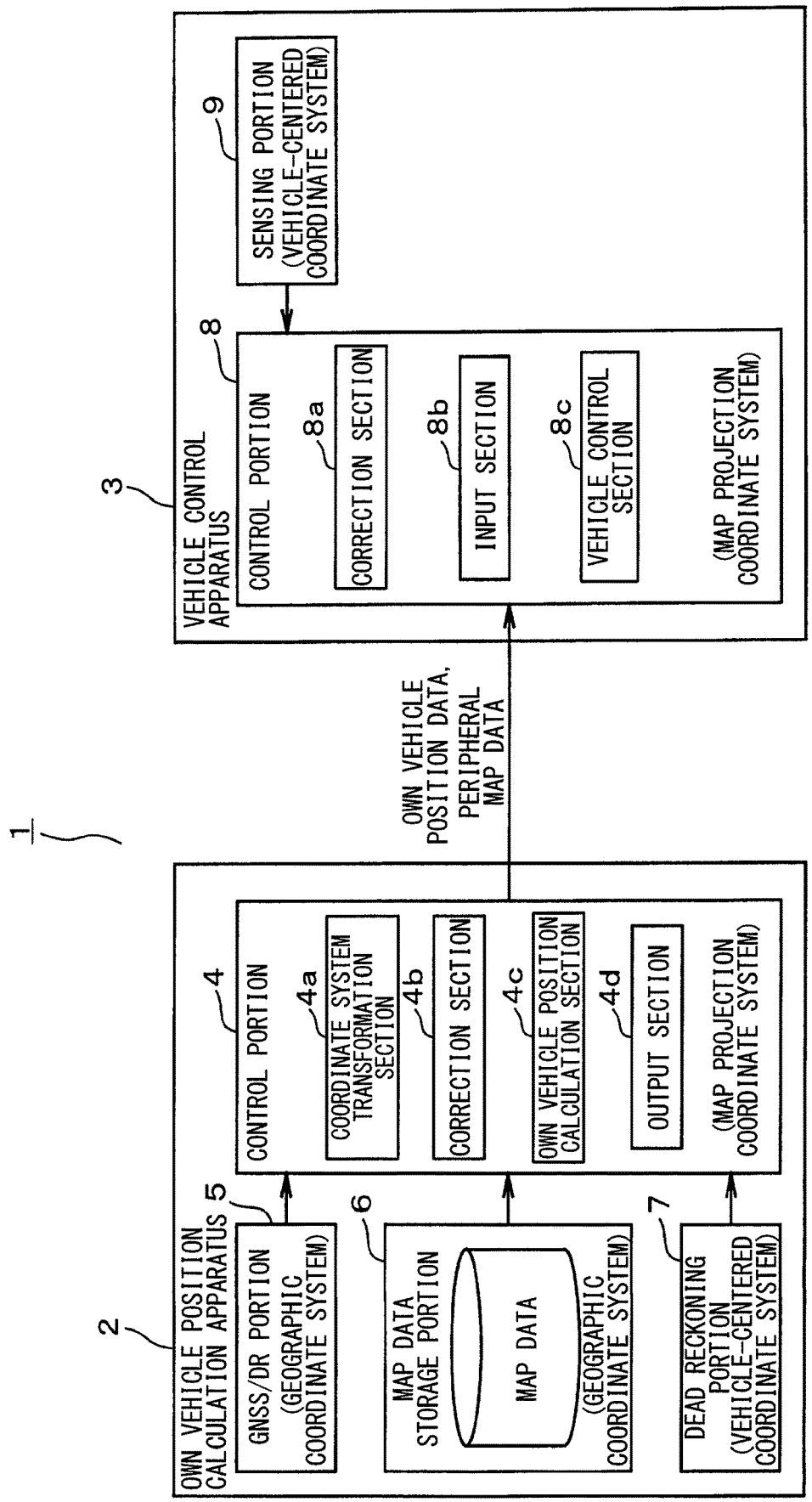
FIG. 1 is a functional block diagram illustrating a first embodiment.

The inventors of the present disclosure have found the following.

A digital map that represents the world may be represented in a geographic coordinate system (that is, latitude and longitude). An actual distance or an actual direction measured by, for example, a camera, a millimeter wave, or a LIDAR may be represented in a plane rectangular coordinate system which is compatible with a vehicle-centered coordinate system. When own vehicle position data is exchanged between a geographic coordinate system and a plane rectangular coordinate system, coordinate system transformation may be required. In a plane rectangular coordinate system, a range that can be represented in a single system may be limited to a narrow range such as multiple prefectures, and, in a section extending across systems, a result of the coordinate system transformation may vary between the systems. It may be difficult to create an association with an actual distance or an actual direction.

A related art discloses a technique that calculates an interval between two points represented by coordinates not as a distance, but as an angle to avoid distance calculation that requires complicated coordinate system transformation against the problem in that coordinate system transformation is required. Further, another related art discloses a technique that measures a building or a site in a divided manner, and joins multiple partial maps together to form an environment map against the problem in that a range that can be represented in a single system is limited to a narrow range.

In the related art, it may not be possible to calculate the distance itself. Thus, the technique of the related art cannot be applied to a case where a distance or an angle is required. When a distance or an angle is required, complicated coordinate system transformation presented by the Geospatial Information Authority of Japan is required. In another related art, an error can be suppressed to a small error when a region to be measured is a narrow range limited to several kilometers even when projected on a plane. However, when a region such as the entire earth is assumed, the entire region may not be represented in a signal system.

For example, the present disclosure may provide a vehicle control system, an own vehicle position calculation apparatus, a vehicle control apparatus, an own vehicle position calculation program, and a vehicle control program that are capable of appropriately performing vehicle control using an own vehicle position by representing most regions in the world in a single system and eliminating the necessity of complicated coordinate system transformation in creating an association with an actual distance or an actual direction.

For example, an own vehicle position calculation section calculates an own vehicle position on a map by using a coordinate system projected by a conformal map projection that has conformality and represents most regions in the world in a single system. A vehicle control section performs vehicle control using the own vehicle position calculated by the own vehicle position calculation section by using the coordinate system projected by the conformal map projection that has conformality and represents most regions in the world in a single system.

The coordinate system for calculating the own vehicle position on the map and the coordinate system for performing vehicle control using the own vehicle position are unified to the coordinate system projected by the conformal map projection that has conformality and represents most regions in the world in a single system. Accordingly, it is possible to appropriately perform vehicle control using the own vehicle position by representing most regions in the world in a single system and eliminating the necessity of complicated coordinate system transformation in creating an association with an actual distance or an actual direction.

First Embodiment

Figure 2:
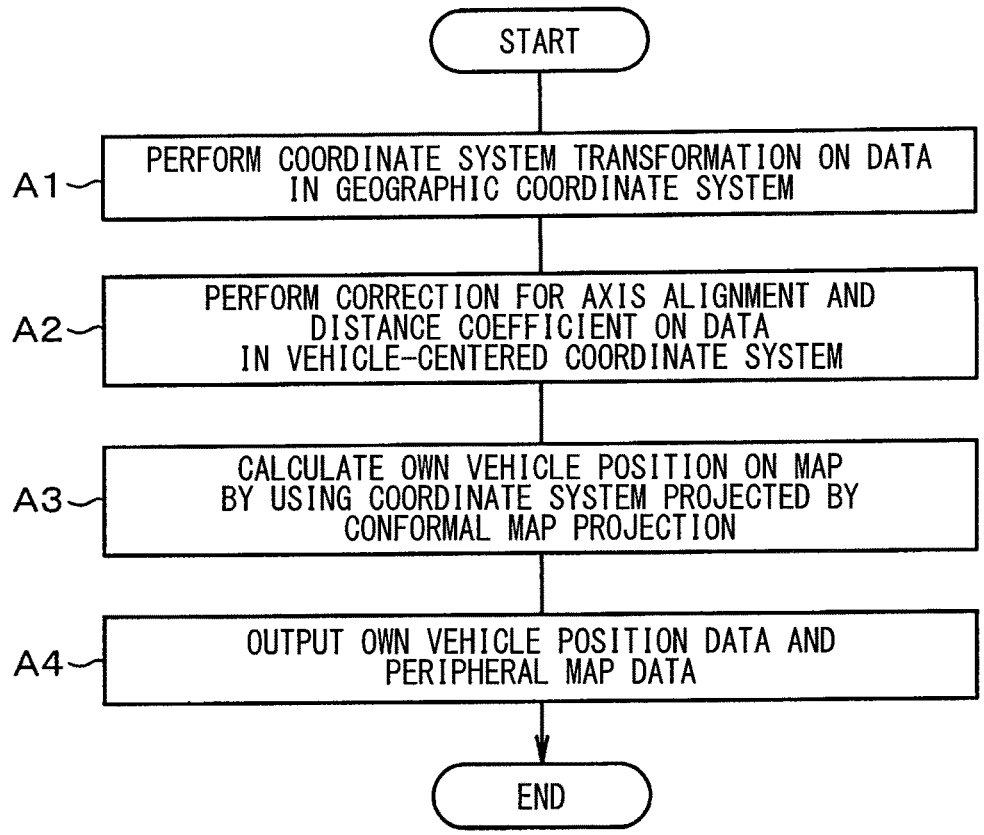
FIG. 2 is a flowchart.
Figure 3:
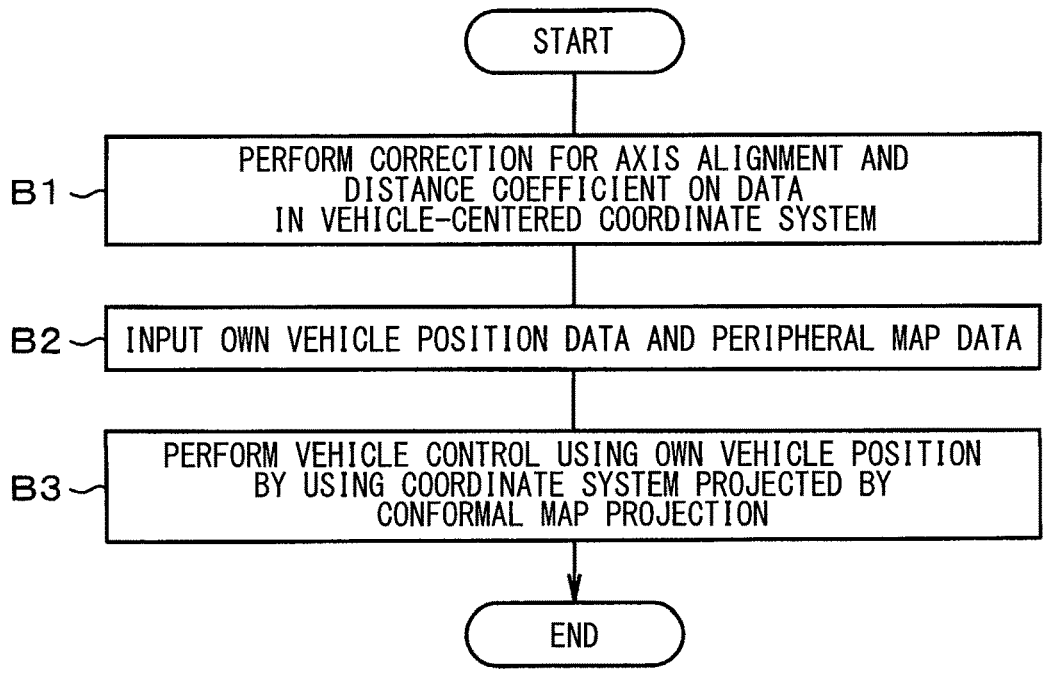
FIG. 3 is a flowchart.

A first embodiment will be described with reference to FIG. 1 to FIG. 3. In a vehicle control system 1, an own vehicle position calculation apparatus 2 and a vehicle control apparatus 3 are capable of performing data communication with each other. The own vehicle position calculation apparatus 2 includes a controller 4, a global navigation satellite system/dead reckoning (GNSS/DR) portion 5, a map data storage 6, and a dead reckoning portion 7. The GNSS/DR portion 5 performs calibration according to the accuracy of GNSS point positioning with respect to various autonomous sensors such as a gyro sensor and an acceleration sensor to increase the accuracy of detection by the various autonomous sensors and generates a continuous relative locus shape by the various autonomous sensors having the increased accuracy. Then, the GNSS/DR portion 5 calculates continuous positioning data which is independent of right or wrong of the GNSS point positioning by combining a position and a direction of the GNSS point positioning according to a position accuracy and a direction accuracy of the GNSS point positioning with the relative locus shape, and outputs the calculated positioning data and the continuous relative locus shape to the controller 4. The positioning data output from the GNSS/DR portion 5 to the controller 4 is data in a geographic coordinate system.

The map data storage 6 stores map data therein and outputs the stored map data to the controller 4. The map data output from the map data storage 6 to the controller 4 is data in a geographic coordinate system. The dead reckoning portion 7 outputs dead reckoning data relating to dead reckoning to the controller 4. The dead reckoning data output from the dead reckoning portion 7 to the controller 4 is data in a vehicle-centered coordinate system.

The controller 4 includes a microcomputer which includes a central processing unit (CPU), a read only memory (ROM), a random access memory (RAM), and an input/output (I/O). The controller 4 executes a computer program stored in a non-transitory tangible storage medium to execute a process corresponding to the computer program to control the entire operation of the own vehicle position calculation apparatus 2.

The controller 4 includes a coordinate system transformation section 4a, a correction section 4b, an own vehicle position calculation section 4c, and an own vehicle position output section 4d. Each of the sections 4a to 4d is composed of an own vehicle position calculation program executed by the controller 4 and implemented by software. The coordinate system transformation section 4a performs coordinate system transformation on data in a geographic coordinate system. That is, the coordinate system transformation section 4a performs the coordinate system transformation on the positioning data input from the GNSS/DR portion 5 and the map data input from the map data storage 6. The correction section 4b performs correction for axis alignment and a distance coefficient on data in a vehicle-centered coordinate system. That is, the correction section 4b performs the correction for axis alignment and a distance coefficient on the dead reckoning data input from the dead reckoning portion 7.

The own vehicle position calculation section 4c calculates an own vehicle position on a map from the positioning data which is input from the GNSS/DR portion 5 and has the coordinate system transformed by the coordinate system transformation section 4a, the map data which is input from the map data storage 6 and has the coordinate system transformed by the coordinate system transformation section 4a, and the dead reckoning data which is input from the dead reckoning portion 7 and has the axis alignment and the distance coefficient corrected by the correction section 4b by using a coordinate system projected by a conformal map projection which has conformality and represents most regions in the world in a single system. The conformal projection which has conformality and represents most regions in the world in a single system is, for example, the Mercator projection. The Mercator projection is characterized in that distortions in distance and area are relatively large in a region at a latitude of 85° or more (that is, the polar region), but distortions in distance and area are relatively small in a region at a latitude of less than 85° (that is, a region other than the polar region). The own vehicle position output section 4d outputs own vehicle position data which indicates the own vehicle position calculated by the own vehicle position calculation section 4c and peripheral map data which indicates a peripheral map of the own vehicle position to the vehicle control apparatus 3. Each of the own vehicle position data and the peripheral map data is data in a map projection coordinate system.

The vehicle control apparatus 3 includes a controller 8 and a sensing portion 9. The sensing portion 9 is a sensor such as a camera, a millimeter wave radar, or a light detection and ranging (LIDAR). The sensing portion 9 detects the presence of an object (e.g., a preceding vehicle or a pedestrian) ahead of the own vehicle and outputs sensor data which indicates a result of the detection to the controller 8. The sensor data output from the sensing portion 9 to the controller 8 is data in a vehicle-centered coordinate system.

The controller 8 includes a microcomputer which includes a CPU, a ROM, a RAM, and an I/O. The controller 8 executes a computer program stored in a non-transitory tangible storage medium to execute a process corresponding to the computer program to control the entire operation of the vehicle control apparatus 3.

The controller 8 includes a correction section 8a, an own vehicle position input section 8b, and a vehicle control section 8c. Each of the sections 8a to 8c is composed of a vehicle control program executed by the controller 8 and implemented by software.

The correction section 8a performs correction for axis alignment and a distance coefficient on data in a vehicle-centered coordinate system. That is, the correction section 8a performs the correction for axis alignment and a distance coefficient on the sensor data input from the sensing portion 9. The own vehicle position input section 8b inputs own vehicle position data and peripheral map data from the own vehicle position calculation apparatus 2. The vehicle control section 8c performs vehicle control using an own vehicle position indicated by the own vehicle position data input by the own vehicle position input section 8b by using the coordinate system projected by the conformal map projection which has conformality and represents most regions in the world in a single system. Specifically, the vehicle control section 8c controls, for example, an accelerator opening, an oil pressure of a brake, and a steering angle of a steering to control automatic driving.

An action of the configuration described above will be described with reference to FIG. 2 and FIG. 3. The controller 4 of the own vehicle position calculation apparatus 2 performs an own vehicle position calculation process. The controller 8 of the vehicle control apparatus 3 performs a vehicle control process.

(1) Own Vehicle Position Calculation Process

In the own vehicle position calculation apparatus 2, when the controller 4 starts the own vehicle position calculation process, the controller 4 performs coordinate system transformation on data in a geographic coordinate system of positioning data input from the GNSS/DR portion 5 and map data input from the map data storage 6 (A1). The controller 4 performs correction for axis alignment and a distance coefficient on data in a vehicle-centered coordinate system of dead reckoning data input from the dead reckoning portion 7 (A2). The controller 4 calculates an own vehicle position on a map from the positioning data which is input from the GNSS/DR portion 5 and has the coordinate system transformed by the coordinate system transformation section 4a, the map data which is input from the map data storage 6 and has the coordinate system transformed by the coordinate system transformation section 4a, and the dead reckoning data which is input from the dead reckoning portion 7 and has the axis alignment and the distance coefficient corrected by the correction section 4b (A3, corresponding to an own vehicle position calculation step). The controller 4 outputs own vehicle position data which indicates the calculated own vehicle position and peripheral map data which indicates a peripheral map of the own vehicle position to the vehicle control apparatus 3 (A4, corresponding to an own vehicle position output step), and finishes the own vehicle position calculation process.

(2) Vehicle Control Process

In the vehicle control apparatus 3, when the controller 8 starts the vehicle control process, the controller 8 performs correction for axis alignment and a distance coefficient on data in a vehicle-centered coordinate system of sensor data input from the sensing portion 9 (B1). The controller 8 inputs own vehicle position data and peripheral map data from the own vehicle position calculation apparatus 2 (B2, corresponding to an own vehicle position input step). The controller 8 performs vehicle control using an own vehicle position indicated by the input own vehicle position data by using a coordinate system projected by a conformal map projection which has conformality and represents most regions in the world in a single system (B3, corresponding to a vehicle control step), and finishes the vehicle control process.

As described above, according to the first embodiment, the following effect can be obtained.

In the vehicle control system 1, the coordinate system for calculating the own vehicle position on the map in the own vehicle position calculation apparatus 2 and the coordinate system for performing vehicle control using the own vehicle position in the vehicle control apparatus 3 are unified to the coordinate system projected by the conformal map projection which has conformality and represents most regions in the world in a single system. Accordingly, it is possible to appropriately perform vehicle control using the own vehicle position by representing most regions in the world in a single system and eliminating the necessity of complicated coordinate system transformation in creating an association with an actual distance or an actual direction.

Second Embodiment

Figure 4:
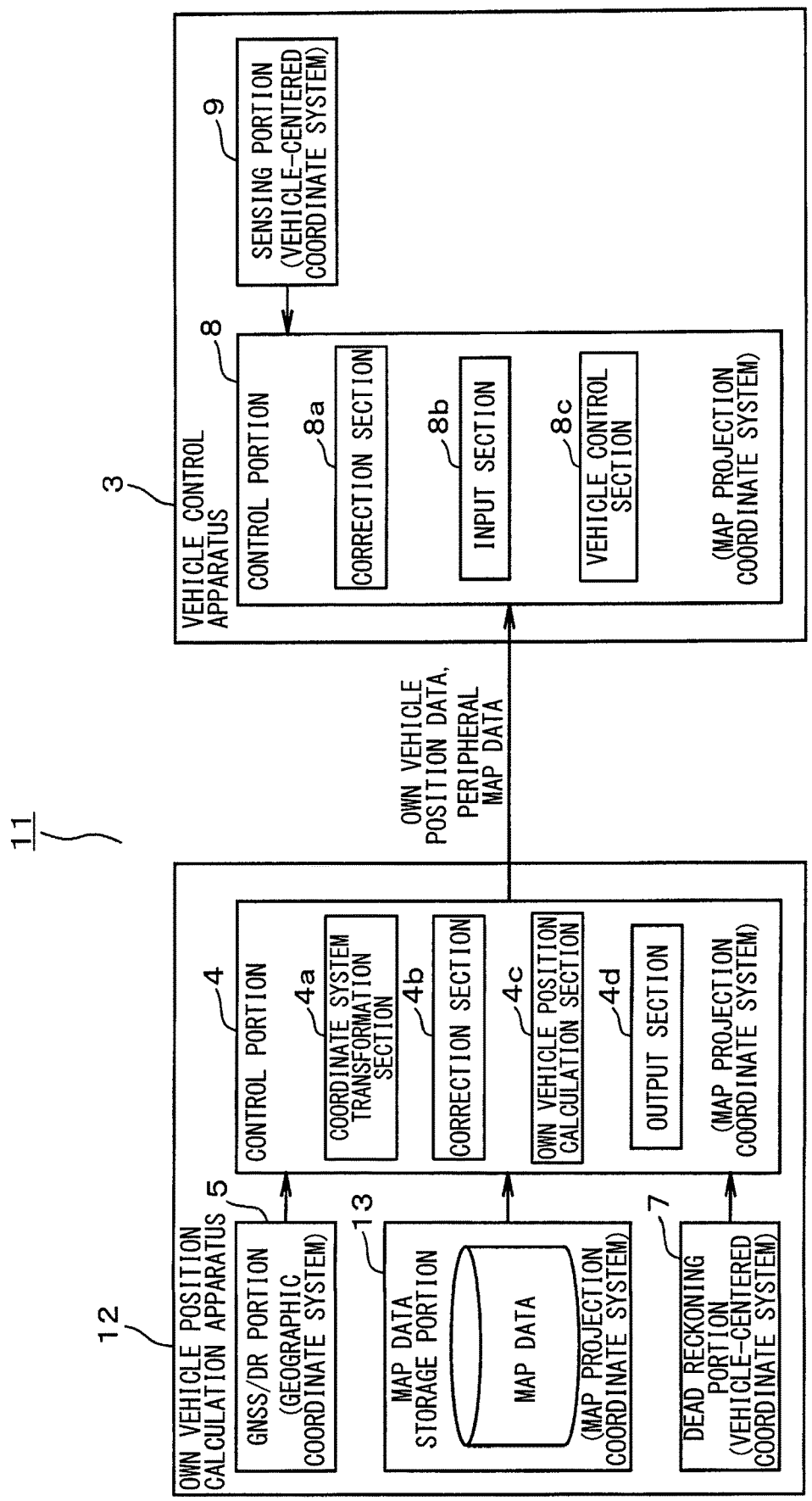
FIG. 4 is a functional block diagram illustrating a second embodiment.

A second embodiment will be described with reference to FIG. 4.

Description for the same part as the first embodiment described above will be omitted, and a different part will be described. In the first embodiment, the map data storage 6 stores map data as data in a geographic coordinate system. In the second embodiment, a map data storage stores map data as data in a map projection coordinate system.

In a vehicle control system 11, an own vehicle position calculation apparatus 12 and a vehicle control apparatus 3 are capable of performing data communication with each other. A map data storage 13 of the own vehicle position calculation apparatus 12 stores map data as data in a map projection coordinate system.

According to the second embodiment, an action and an effect similar to those of the first embodiment can be obtained. Further, it is not necessary for a controller 4 to perform coordinate system transformation on map data input from the map data storage 13. Thus, a load on the own vehicle position calculation apparatus 12 can be reduced.

Third Embodiment

Figure 5:
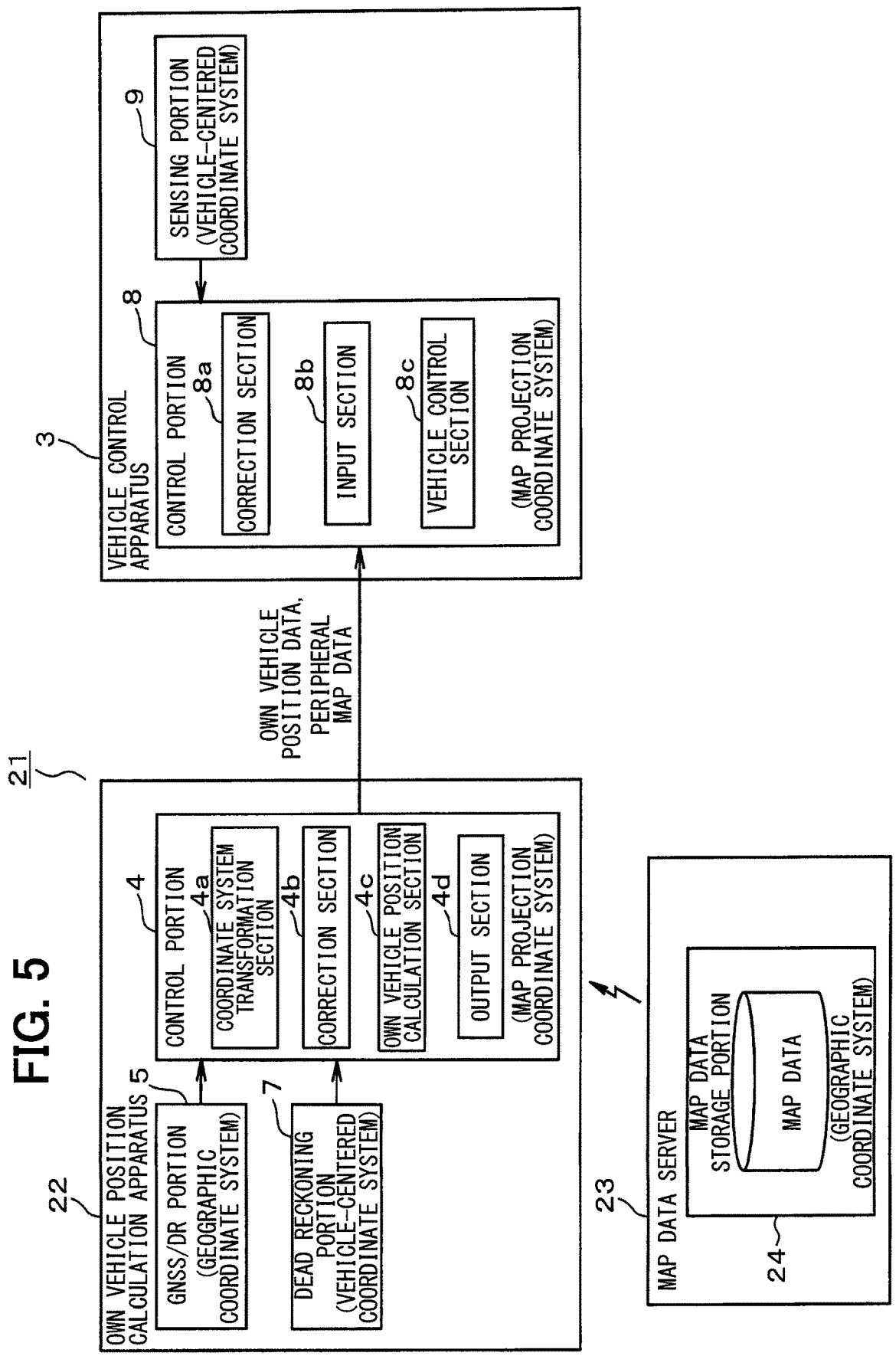
FIG. 5 is a functional block diagram illustrating a third embodiment.

A third embodiment will be described with reference to FIG. 5.

Description for the same part as the first embodiment described above will be omitted, and a different part will be described. In the first embodiment, the map data storage 6 is provided inside the own vehicle position calculation apparatus 2. In the third embodiment, a map data storage is provided outside an own vehicle position calculation apparatus.

In a vehicle control system 21, an own vehicle position calculation apparatus 22 and a vehicle control apparatus 3 are capable of performing data communication with each other, and a map data server 23 and the own vehicle position calculation apparatus 22 are capable of performing data communication with each other. The map data server 23 includes a map data storage 24 which is equivalent to the map data storage 6 described in the first embodiment. The map data server 23 may be a physical server having a physical substance or may be a virtual cloud server having no physical substance.

According to the third embodiment, an action and an effect similar to those of the first embodiment can be obtained. Further, it is not necessary for the own vehicle position calculation apparatus 22 to include a map data storage. Thus, it is possible to simplify the configuration of the own vehicle position calculation apparatus 22.

Fourth Embodiment

Figure 6:
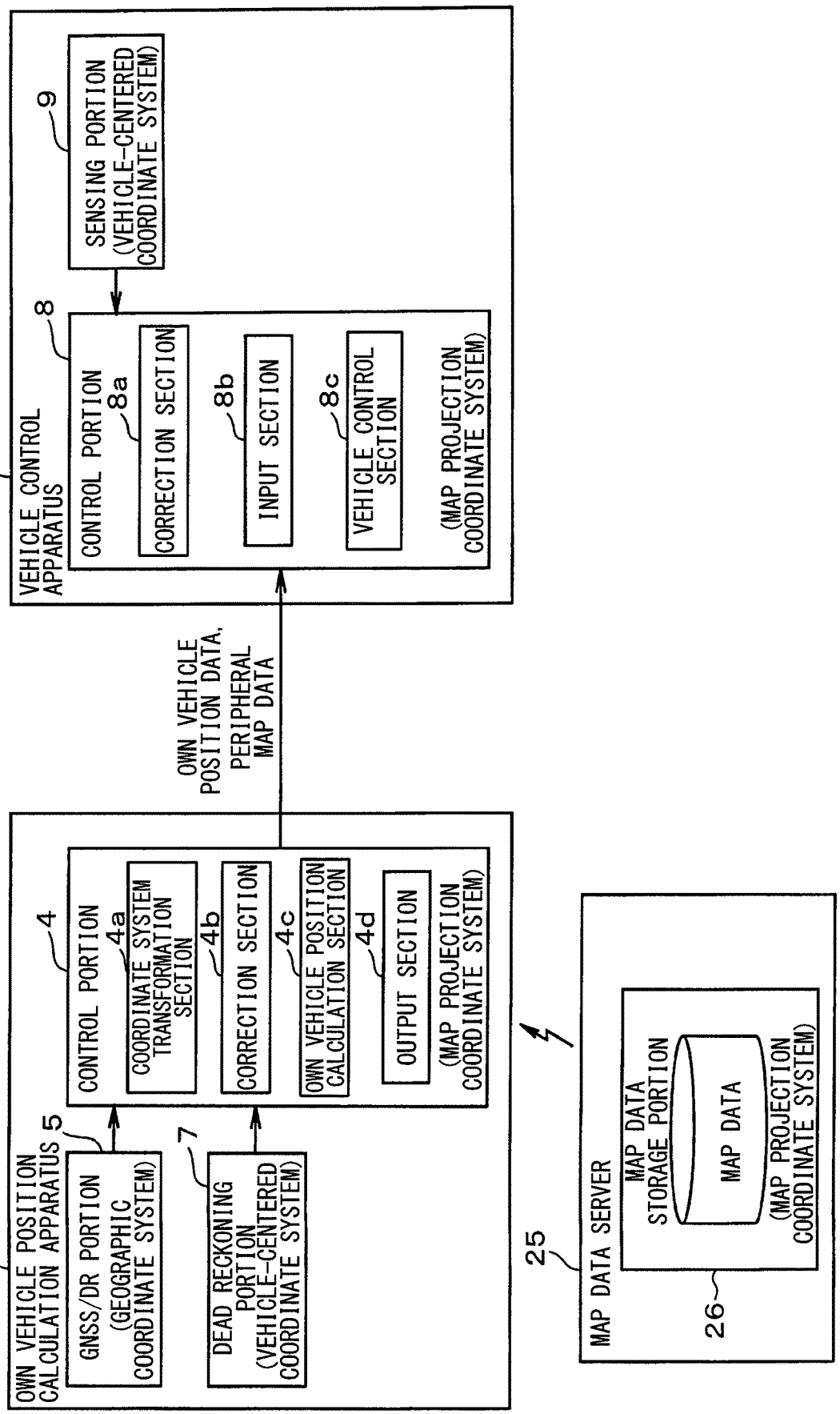
FIG. 6 is a functional block diagram illustrating a fourth embodiment.

A fourth embodiment will be described with reference to FIG. 6. Description for the same part as the third embodiment described above will be omitted, and a different part will be described. In the third embodiment, the map data storage 24 of the map data server 23 stores map data as data in a geographic coordinate system. In the fourth embodiment, a map data storage of a map data server stores map data as data in a map projection coordinate system.

A map data storage 26 of a map data server 25 stores map data as data in a map projection coordinate system.

According to the fourth embodiment, an action and an effect similar to those of the third embodiment can be obtained. Further, it is not necessary for a controller 4 to perform coordinate system transformation on map data input from the map data server 25. Thus, a load on an own vehicle position calculation apparatus 22 can be reduced.

Fifth Embodiment

Figure 7:
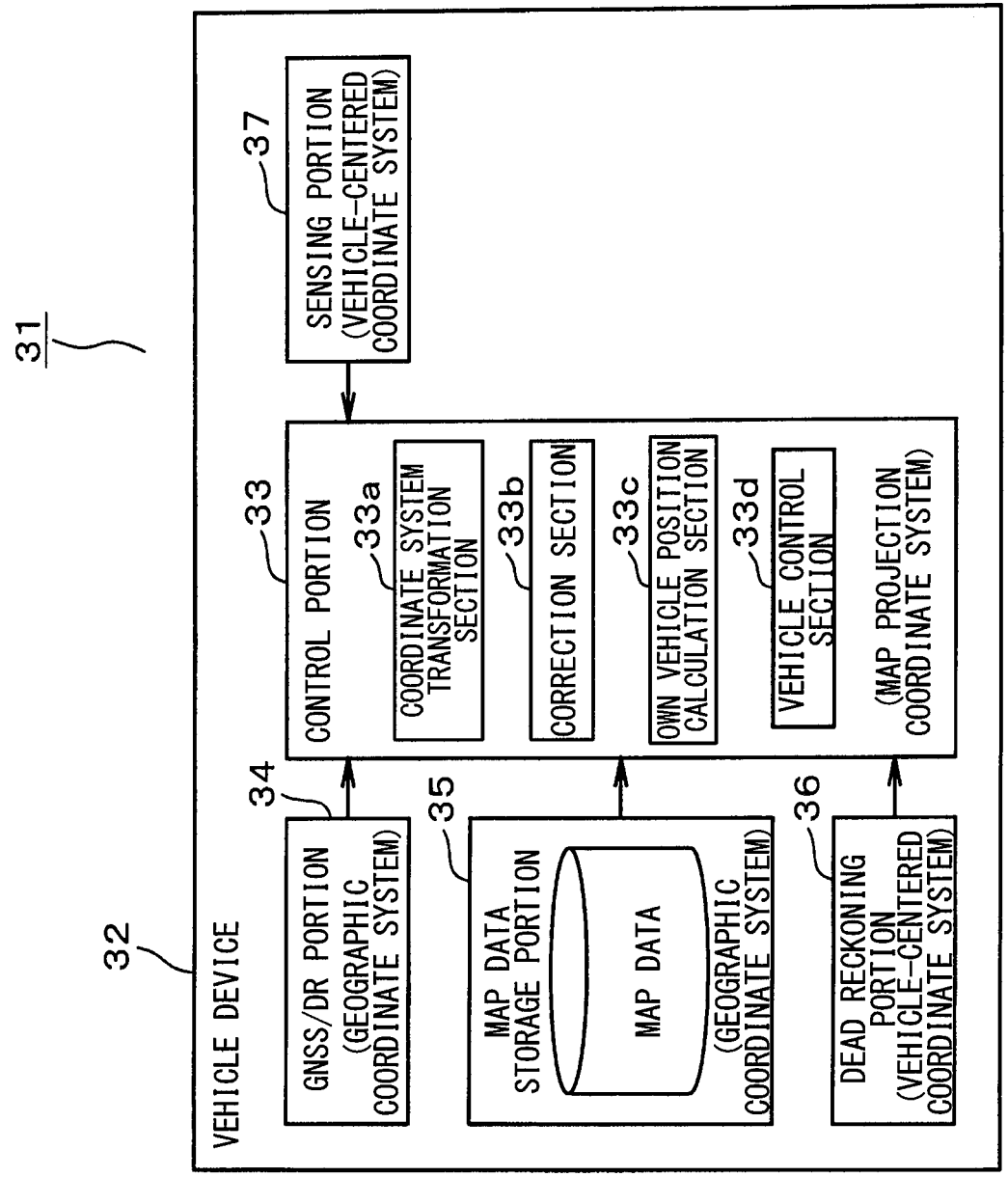
FIG. 7 is a functional block diagram illustrating a fifth embodiment.

A fifth embodiment will be described with reference to FIG. 7. Description for the same part as the first embodiment described above will be omitted, and a different part will be described. In the first embodiment, the own vehicle position calculation apparatus 2 which calculates the own vehicle position on the map and the vehicle control apparatus 3 which performs vehicle control using the own vehicle position are provided as separate apparatus. In the fifth embodiment, a function of calculating an own vehicle position on a map and a function of performing vehicle control using the own vehicle position are provided in the same apparatus.

A vehicle control system 31 includes a vehicle apparatus 32. The vehicle apparatus 32 includes a controller 33, a GNSS/DR portion 34, a map data storage 35, a dead reckoning portion 36, and a sensing portion 37. The portions 34 to 37 are equivalent to the portions 5 to 9 described in the first embodiment, respectively.

The controller 33 includes a microcomputer which includes a CPU, a ROM, a RAM, and an I/O. The controller 33 includes a coordinate system transformation section 33a, a correction section 33b, an own vehicle position calculation section 33c, and a vehicle control section 33d which are equivalent to the coordinate system transformation section 4a, the correction section 4b, 8a, the own vehicle position calculation section 4c, and the vehicle control section 8c described in the first embodiment, respectively.

According to the fifth embodiment, an action and an effect similar to those of the first embodiment can be obtained. That is, also in the configuration in which the function of calculating the own vehicle position on the map and the function of performing vehicle control using the own vehicle position are provided in the same apparatus, it is possible to appropriately perform the vehicle control using the own vehicle position by unifying coordinate systems in the respective functions to a coordinate system projected by a conformal map projection which has conformality and represents most regions in the world in a single system.

Sixth Embodiment

Figure 8:
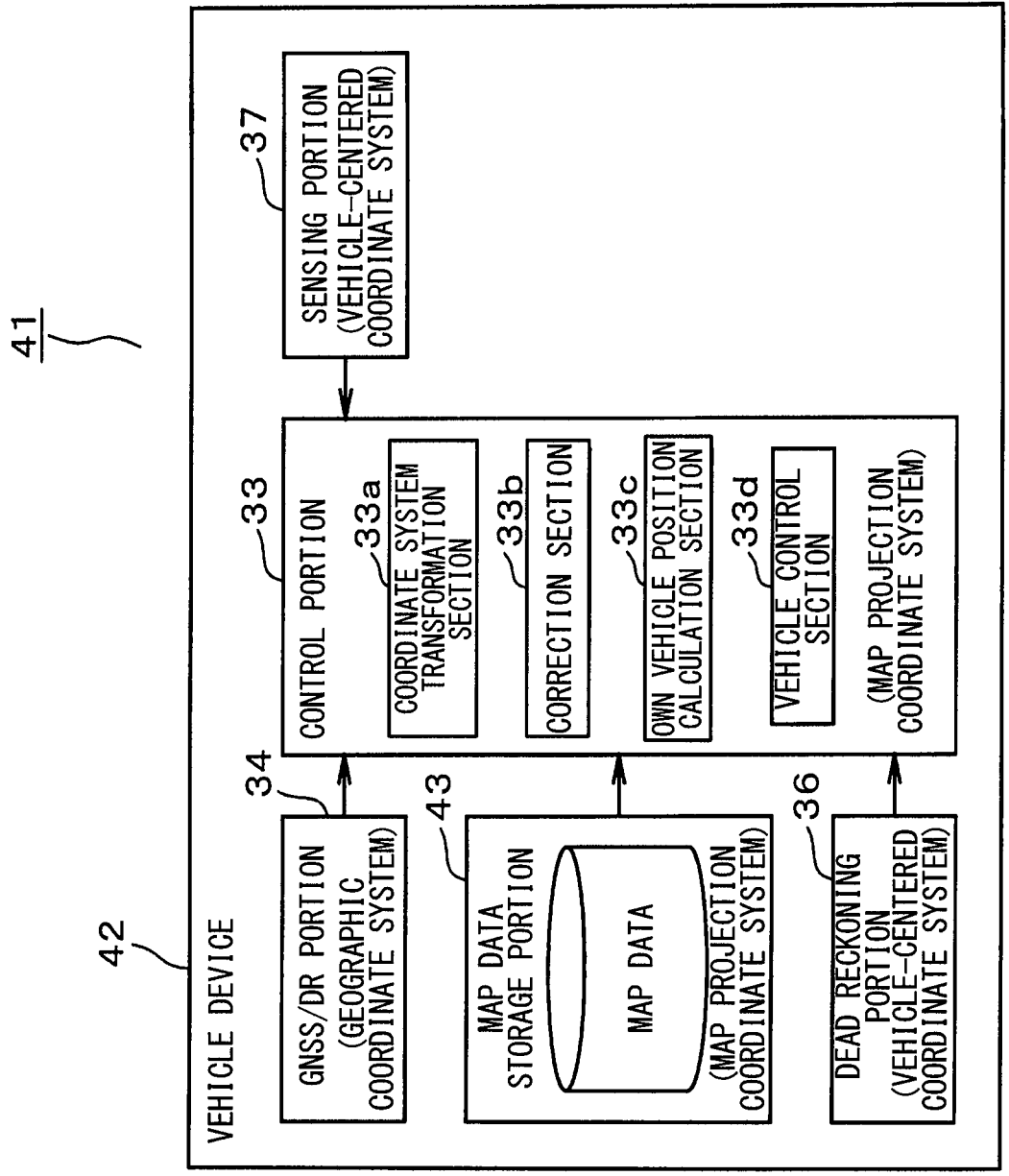
FIG. 8 is a functional block diagram illustrating a sixth embodiment.

A sixth embodiment will be described with reference to FIG. 8. Description for the same part as the fifth embodiment described above will be omitted, and a different part will be described. In the fifth embodiment, the map data storage 35 stores map data as data in a geographic coordinate system. In the sixth embodiment, a map data storage sores map data as data in a map projection coordinate system.

A vehicle control system 41 includes a vehicle apparatus 42. The vehicle apparatus 42 includes a controller 33, a GNSS/DR portion 34, a map data storage 43, a dead reckoning portion 36, and a sensing portion 37. The map data storage 43 stores map data as data in a map projection coordinate system.

According to the sixth embodiment, an action and an effect similar to those of the fifth embodiment can be obtained. Further, it is not necessary for the controller 33 to perform coordinate system transformation on map data input from the map data storage 43. Thus, a load on the vehicle apparatus 42 can be reduced.

Other Embodiments

While the present disclosure has been described based on the embodiments, it is to be understood that the present disclosure is not limited to the described embodiments and structures. The present disclosure also includes various modifications and modifications within the equivalent range thereof. In addition, various combinations or modes, and other combinations or modes including only one element, more, or less thereof are also included in the scope and idea range of the present disclosure.

The Mercator projection has been described as an example of a conformal projection which has conformality and represents most regions in the world in a single system. However, any conformal projection, other than the Mercator projection, which has conformality and represents most regions in the world in a single system may be employed.

The above embodiments may be combined. For example, the second embodiment and the third embodiment may be combined so that the map data storage of the map data server stores map data as data in a map projection coordinate system.

It is noted that a flowchart or the processing of the flowchart in the present application includes multiple steps (also referred to as sections), each of which is represented, for instance, as A1. Further, each step can be divided into several sub-steps while several steps can be combined into a single step.

Controllers and methods described in the present disclosure may be implemented by a special purpose computer created by configuring a memory and a processor programmed to execute one or more particular functions embodied in computer programs. Alternatively, the control units, the controllers and the methods described in the present disclosure may be implemented by a special purpose computer created by configuring a processor provided by one or more special purpose hardware logic circuits. Further alternatively, the control units, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of vehicle control system, own vehicle position calculation apparatus, vehicle control apparatus, own vehicle position calculation program, and non-transitory computer readable storage medium according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A vehicle control system that calculates an own vehicle position on a map and performs vehicle control using the calculated own vehicle position, the vehicle control system comprising:
   a first microcomputer including a processor, the first microcomputer configured to calculate the own vehicle position on the map by using a coordinate system projected by conformal map projection that has conformality and represents a region at a latitude below 85° in a single system; and
   a second microcomputer including a processor, the second microcomputer configured to control the own vehicle by using the calculated own vehicle position.

2. The vehicle control system according to claim 1, wherein:
   the first microcomputer is further configured to calculate the own vehicle position on the map by using a coordinate system projected by a Mercator map projection; and
   the second microcomputer is further configured to control the own vehicle by using the coordinate system projected by the Mercator map projection.

3. The vehicle control system according to claim 1, wherein:
   the first microcomputer is further configured to perform coordinate system transformation on data in a geographic coordinate system.

4. The vehicle control system according to claim 1, wherein:
   the first microcomputer and the second microcomputer are further configured to correct an axis alignment and a distance coefficient on data in a vehicle-centered coordinate system.

5. The vehicle control system according to claim 1, further comprising:
   an own vehicle position calculation apparatus that includes the first microcomputer; and
   a vehicle control apparatus that includes the second microcomputer.

6. The vehicle control system according to claim 1, wherein:
   the first microcomputer and the second microcomputer are provided together as a single microcomputer.

7. An own vehicle position calculation apparatus that constitutes a vehicle control system together with a vehicle control apparatus that performs vehicle control using an own vehicle position, the own vehicle position calculation apparatus comprising:
   a microcomputer including a processor, the microcomputer configured to
      calculate the own vehicle position on a map by using a coordinate system projected by a conformal map projection that has conformality and represents a region at a latitude below 85° in a single system; and
      output the own vehicle position calculated by the microcomputer to the vehicle control apparatus.

8. A vehicle control apparatus that constitutes a vehicle control system together with an own vehicle position calculation apparatus that calculates an own vehicle position on a map, the vehicle control apparatus comprising:
   a microcomputer including a processor, the microcomputer configured to
      input the own vehicle position from the own vehicle position calculation apparatus; and
      perform vehicle control using the own vehicle position input by the microcomputer by using a coordinate system projected by a conformal map projection that has conformality and represents a region at a latitude below 85° in a single system.

9. A non-transitory computer readable storage medium that stores an own vehicle position calculation program that causes a controller of an own vehicle position calculation apparatus that constitutes a vehicle control system together with a vehicle control apparatus that performs vehicle control using an own vehicle position to execute:
   an own vehicle position calculation that calculates the own vehicle position on a map by using a coordinate system projected by a conformal map projection that has conformality and represents a region at a latitude below 85° in a single system; and
   an own vehicle position output that outputs the own vehicle position calculated by the own vehicle position calculation to the vehicle control apparatus.

10. A non-transitory computer readable storage medium that stores a vehicle control program that causes a controller of a vehicle control apparatus that constitutes a vehicle control system together with an own vehicle position calculation apparatus that calculates an own vehicle position on a map to execute:
   an own vehicle position input that inputs the own vehicle position from the own vehicle position calculation apparatus; and
   a vehicle control that performs vehicle control using the own vehicle position input by the own vehicle position input by using a coordinate system projected by a conformal map projection that has conformality and represents a region at a latitude below 85° in a single system.

* * * * *